United States Patent [19]

Machishima

[11] Patent Number: 5,253,047
[45] Date of Patent: Oct. 12, 1993

[54] COLOR CCD IMAGER HAVING A SYSTEM FOR PREVENTING REPRODUCIBILITY DEGRADATION OF CHROMATIC COLORS

[75] Inventor: Eiji Machishima, Tokyo, Japan
[73] Assignee: Sony Corporation, Tokyo, Japan
[21] Appl. No.: 760,503
[22] Filed: Sep. 16, 1991

[30] Foreign Application Priority Data

Sep. 14, 1990 [JP] Japan .................. 2-245463

[51] Int. Cl.$^5$ .............................................. H04N 9/07
[52] U.S. Cl. ......................................... 358/44; 358/29; 358/39
[58] Field of Search ................ 358/41, 43, 44, 29, 358/32, 39, 31

[56] References Cited

U.S. PATENT DOCUMENTS

| | | | |
|---|---|---|---|
| 4,700,219 | 10/1987 | Tanaka et al. | 358/41 |
| 4,827,331 | 5/1989 | Nakamura et al. | 358/44 |
| 4,833,527 | 5/1989 | Kondo | 358/44 |
| 4,974,066 | 11/1990 | Tusji | 358/44 |
| 5,068,718 | 11/1991 | Iwabe et al. | 358/39 |

FOREIGN PATENT DOCUMENTS

| | | |
|---|---|---|
| 0368614 | 5/1990 | European Pat. Off. |
| 57-39684 | 3/1982 | Japan . |
| 2196507A | 4/1988 | United Kingdom . |

OTHER PUBLICATIONS

IEEE 1990 International Conference on Consumer Electronics, Digest of Technical Papers, Jun. 6-8, 1990; Takuya Imaide et al, "A Compact CCD Color Camera System with Digital AWB Control".

8087 IEEE Transactions on Consumer Electronics, 36 Nov., 1990, No. 4, Takuya Imaide et al, "A Compact CCD Color Camera System with Digital AWB Control".

*Primary Examiner*—Edward L. Coles, Sr.
*Assistant Examiner*—Kim Yen Vu
*Attorney, Agent, or Firm*—Hill, Steadman & Simpson

[57] ABSTRACT

A color video camera according to the present invention includes a color temperature detector for detecting a color temperature of a video source and a primary color separator, wherein matrix coefficients of the primary color separator are controlled in accordance with an output of the color temperature detector in such a manner that, for example, when the color temperature of a video source is low, that is, the color of a video source is reddish, red and blue components of the video source are corrected to be weakened and intensified respectively. On the contrary, when the color temperature of a video source is high, that is, the color of a video source is bluish, the red and blue components of the video source are corrected to be intensified and weakened respectively, whereby the degradation of the color reproducibility of the chromatic colors due to the change in the color temperature can be prevented.

12 Claims, 7 Drawing Sheets

COLOR CCD IMAGER HAVING A SYSTEM FOR PREVENTING REPRODUCIBILITY DEGRADATION OF CHROMATIC COLORS

BACKGROUND OF THE INVENTION

1. Field of the Invention

The present invention relates to color video cameras and more particularly to color video cameras intended to improve color reproducibility of chromatic colors.

2. Description of the Prior Art

Figure 1A:
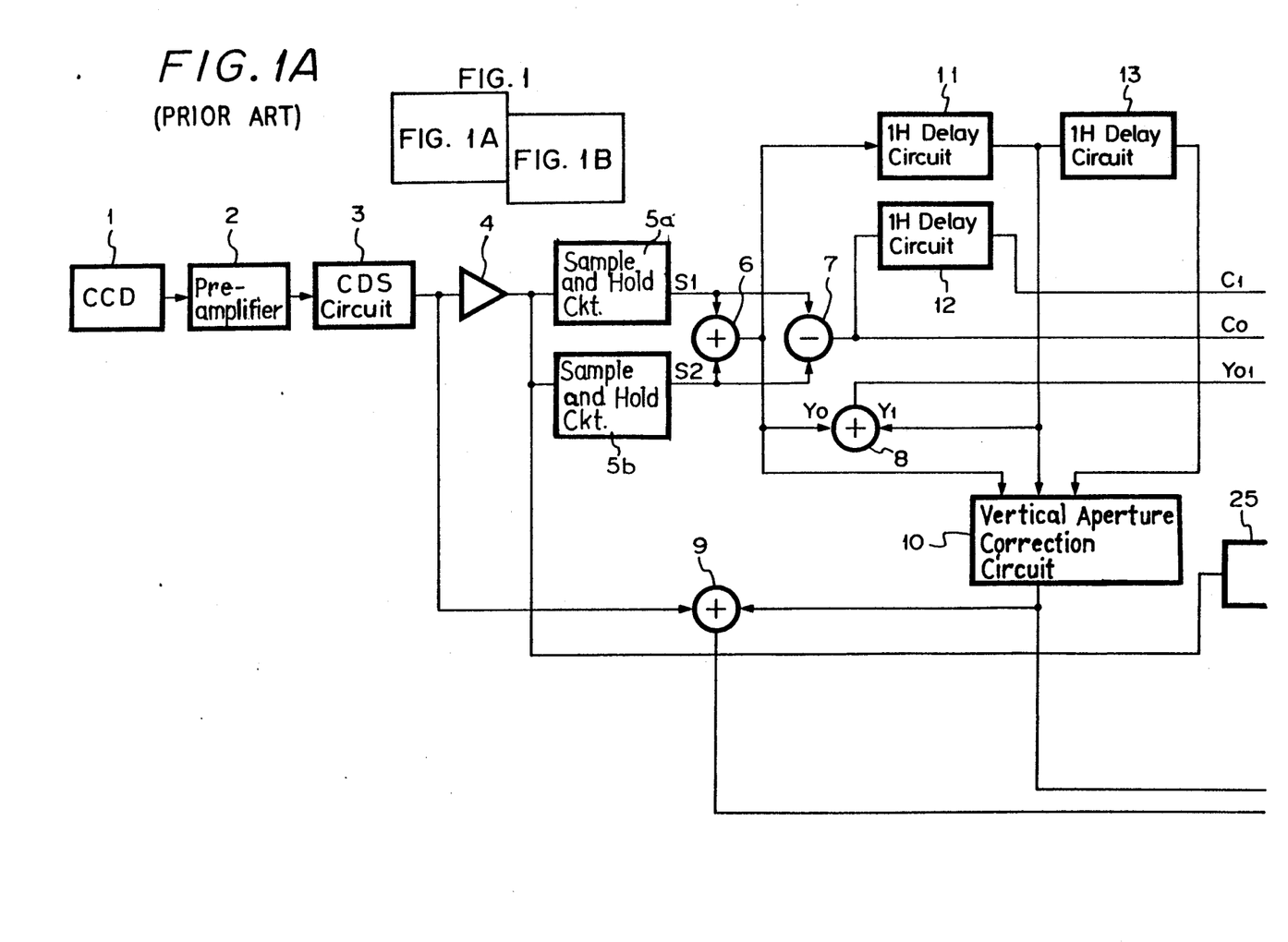
Figure 1B:
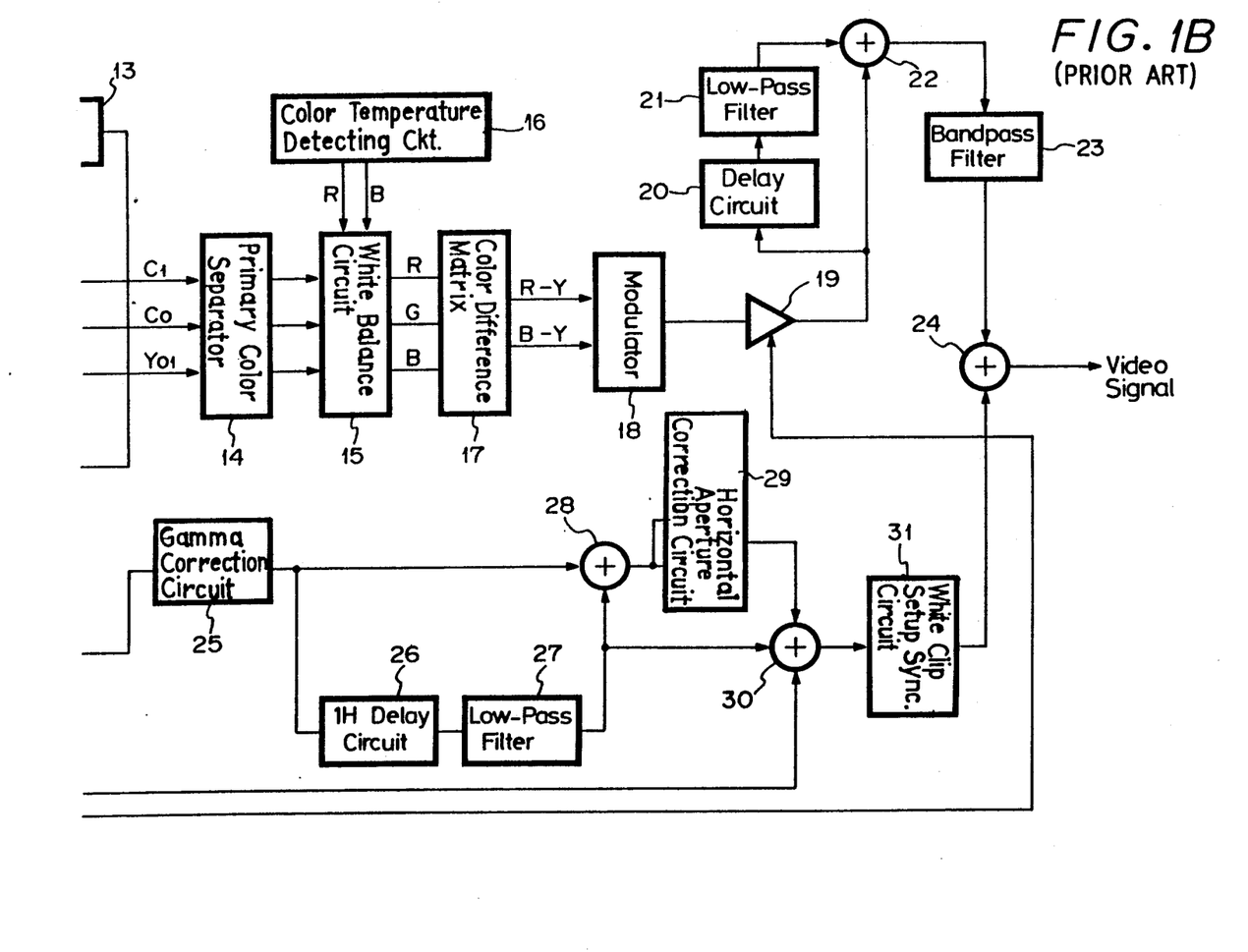

There have been known various types of solid-state color video cameras as disclosed in Japanese Patent Laid-Open Publication No. 64-73881, etc. FIG. 1 (formed of FIGS. 1A and 1B drawn on two sheets of drawings so as to permit the use of a suitably large scale) is a circuit diagram illustrating an example of the conventional solid-state color video cameras.

Figure 2:
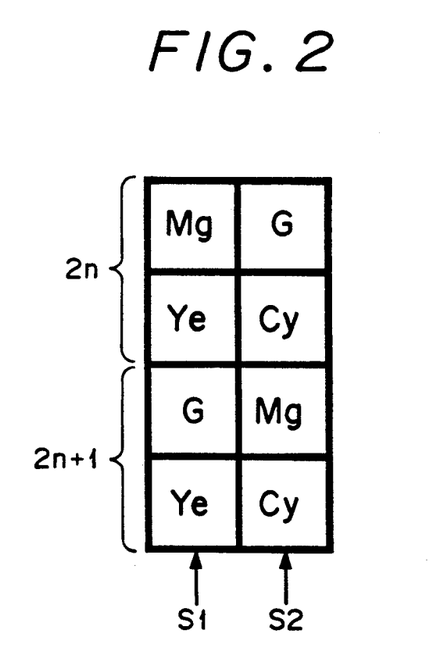
FIG. 2 is a diagram illustrating a color coding of two scanning lines of a color filter.

Referring to FIG. 1, the color video camera includes a solid state image pickup device, for example, charge-coupled device (CCD) 1, a preamplifier 2, a correlated double sampling (CDS) circuit 3, an automatic gain controller (AGC) 4, sample-and-hold (S/H) circuits 5$a$ and 5$b$ for deriving particular chrominance signals S1 and S2 from an output signal of the AGC 4, respectively, adders 6, 8, a subtracter 7, one-horizontal period delay circuits 11 to 13, a white balance circuit 15, and a color temperature detector 16. The adders and subtracter add and subtract the chrominance signals S1 and S2 from the S/H circuits 5$a$ and 5$b$ to generate chrominance signals $C_0$ and $C_1$ and a luminance signal $Y_{01}$. In general, in order to obtain primary color signals R, G and B by providing color filters with such color coding as shown in FIG. 2 on a surface of a solid state image pickup device mounted on a single plate, adding and subtrating operations among one chrominance signal and other chrominance signals are required. The color coding shown in FIG. 2 has a color filter of an even number scanning line which is constituted by a repetitive pattern of four pixels having a magenta·green portion disposed to a lateral direction and a yellow·cyan portion disposed beneath the magenta·green portion in parallel therewith, and a color filter of an odd number scanning line which is constituted by a repetitive pattern of four pixels having a green·magenta portion disposed to a lateral direction and a yellow·cyan portion disposed beneath the green·magenta portion in parallel therewith. When using such a color coding as shown in FIG. 2, for example, a chrominance signals $C_0$ and $C_1$ and the luminance signal $Y_{01}$ are obtained by the following equations $$Y_{01} = Ye + Cy + Mg + G$$

$$C_0 = (Ye + Mg) - (Cy + G)$$

$$C_1 = -\{(Ye + G) - (Cy + Mg)\}$$

Thus obtained respective signals $C_0$, $C_1$ and $Y_{01}$ are processed in accordance with an operation equation, for example, the following equation by a primary color separator 14 to thereby obtain the primary color signals R, G and B.

$$R = C_0 + \alpha(Y_{01} - C_1)$$

$$G = Y_{01} - C_0 - C_1$$

$$B = C_1 + \beta(Y_{01} - C_0)$$

Now, when performing the adding and subtracting operations for obtaining the signals $C_0$, $C_1$ and $Y_{01}$ applied to the primary signal separator 14 the, addend, summand, subtrahend and minuend required for these operations can not be applied simultaneously to the adders and subtracter as signals from the solid state image pickup element side. Thus, the signals of the present horizontal period and the signals of a preceding horizontal period are required to be applied to the adders and subtracter simultaneously by using the line correlation when performing the adding and subtracting operations. To this end, the one-horizontal period delay circuits 11 to 13 are provided in order to provide the signal of the preceding horizontal period simultaneously with the signals of the present horizontal period to the adders and subtracter.

The color temperature detector 16 receives signals, e.g., the primary color signals R, G and B outputted from the primary color separator 14 to discriminate the chrominance signal of an object or video source, thereby controlling the white balance circuit 15 on the basis of the result of the discrimination in a manner that the white balance is adjusted by controlling a gain of a two primary color system, i.e., red R and blue B.

The color video camera further includes a color difference matrix 17 for obtaining color difference signals R−Y and B−Y from the primary color signals R, G and B, a modulator 18 for modulating and superimposing the color difference signals R−Y and B−Y, and a chrominance signal suppressing circuit 19 for suppressing the chrominance signal outputted from the modulator 18. The suppressing circuit 19 is formed by a gain controllable amplifier for suppressing the color signal in accordance with a vertical edge detection signal. The vertical edge detection signal is obtained by adding an output signal from the CDS circuit 3 to an output signal from a vertical aperture correction circuit 10 at an adding circuit 9. Namely, since the vertical aperture correction circuit 10 emphasizes the aperture in the vertical direction, the vertical edge can be detected by using these output signals from the circuits 3 and 10 to thereby suppress the chrominance signal. The color video camera still further includes a delay circuit (DL) 20 for preparing a signal being delayed by one horizontal period (1H period), a low pass filter (LPF) 21, an adder 22, a band pass filter 23, an adder 24 for adding chrominance signals, luminance signal and synchronous signal, a gamma($\gamma$) correction circuit 25 for performing the $\gamma$ correction for a signal system of the luminance signal, an 1-H delay circuit IHDL) 26 for delaying the $\gamma$-corrected signal by one horizontal period, a low-pass filter (LPF) 27, an adder 28, a horizontal aperture correction circuit 29, an adder 30 for preparing the luminance signal, and a white clip setup sync circuit 31 for adding a white clip and sync signal etc. to the luminance signal to apply the added signal to the adder 24 which in turn outputs an NTSC color video signal.

In the conventional color video camera, color temperature information detected by the color temperature detector 16 has been used only for adjusting the white balance. The white balance adjustment is performed so as to reproduce a white object as a white image by adjusting gains of a signal system of the three primary colors R, G and B in accordance with a change in light radiated on the object, that is a, change in a light source (video source). However, the reproducibility of an object can be improved by the white balance adjustment only as to achromatic colors but not chromatic colors, the reason of which will be explained below in detail with reference to FIGS. 3A to 3C.

Figure 3A:
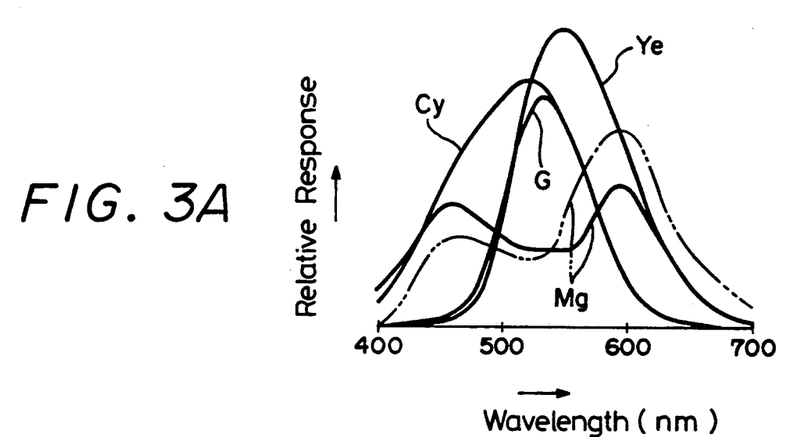
Figure 3B:
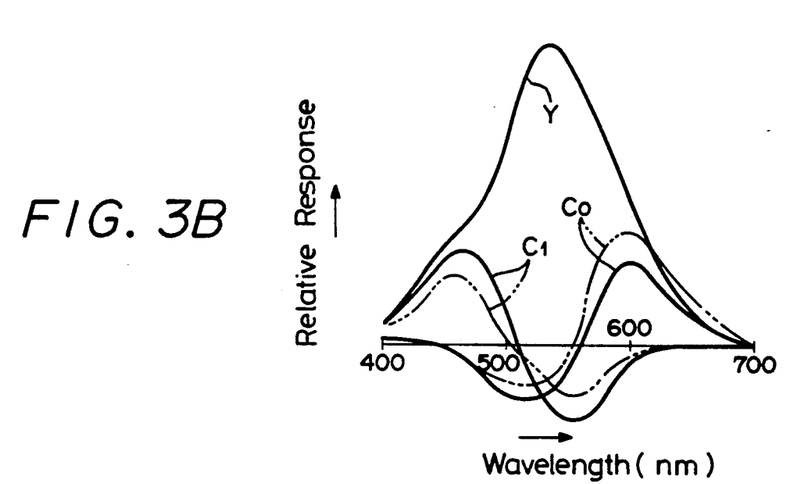
Figure 3C:
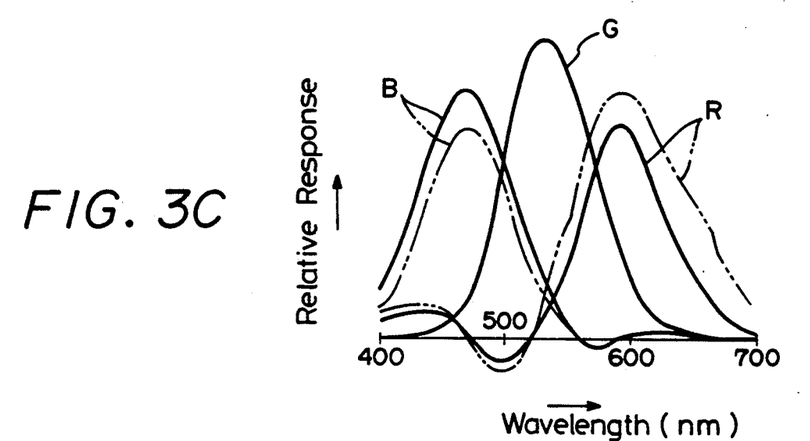

FIGS. 3A to 3C illustrate spectrum response (spectral characteristics) of the color video camera at respective stages, wherein FIG. 3A illustrates a relation between a relative response and a wavelength of each of the chrominance signals passed as to respective color filters Mg, G, Ye and Cy, FIG. 3B a relation between a relative response and a wavelength of each of the luminance signal Y and the chrominance signals $C_1$ and $C_0$, and FIG. 3C a relation between a relative response and a wavelength of each of the primary color signals R, G and B.

Now, there is no problem when the color of the video source is quite white or similar thereto, but there is some problem when it is reddish or bluish on the contrary. Namely, if it is exemplified that the color of the light source is reddish, it is such a case that the electrical illumination of a site of a wedding reception, etc. is dark and the site is illuminated by candlelight. In this case, the candlelight is used as a video source and so the color of the light source becomes strongly reddish to decrease the color temperature remarkably. Therefore, when the cameraman takes a picture by the color video camera in this condition, the spectrum response of the magenta Mg will be changed as shown by a two-dot chain line in FIG. 3A since the red component of the light source increases. Namely, among two peaks of the spectrum curve of the magenta Mg, one peak of which wavelength is shorter seems to become lower and the other peak of which wavelength is longer seems to become higher. This is because the spectrum response of the magenta Mg of the color filter is not changed actually, but the spectrum response of the magenta Mg seems to be changed equivalently since the color of the video source is slightly shifted to the red side in such a tendency that a signal level of red becomes higher and that of blue becomes lower. Thus, the spectrum response of the signals $C_0$, $C_1$, B and G seem to be changed as shown by two-dot chain lines in FIGS. 3B and 3C.

On the contrary, when the color of the video source is bluish, among two peaks of the spectrum response of the magenta Mg, one peak of which wavelength is shorter seems to become higher and the other peak of which wavelength is longer seems to become lower.

Namely, such phenomenon that the spectrum response seems to be changed equivalently by the change of the color temperature means that the color reproduction of chromatic colors can not be performed correctly. In other words, the color reproducibility of chromatic colors is degraded when the color temperature of the video source changes, which is not preferable in a photographing operation by a color video camera.

OBJECTS AND SUMMARY OF THE INVENTION

Accordingly, it is an object of the present invention to provide an improved color video camera in which the aforementioned shortcoming and disadvantages of the prior art can be eliminated.

More particularly, it is another object of the present invention to provide an improved color video camera which is capable of preventing the degradation of the color reproducibility of the chromatic colors by the change in a color temperature of a video source.

It is a further object of the present invention to provide an improved color video camera which is capable of controlling a matrix coefficient of a primary color separator in accordance with change in a color temperature of a video source.

According to an aspect of the present invention, a color video camera is comprised of a color imager including a color sensing device for producing a plurality of different chrominance signals line by line; a luminance/chrominance (Y/C) signal processor supplied with the plurality of different chrominance signals and producing first, second and third primary color signals and having a matrix circuit with predetermined matrix coefficients; an unit for detecting a color temperature of a video source; and a control unit for controlling the matrix coefficients in response to the output of the detecting unit.

According to the color video camera of the present invention, a matrix coefficient of a primary color separator is controlled in accordance with an output of a detecting circuit for detecting a color temperature of a video source in such a manner that, when the color temperature of the video source is low, that is, the color of the video source is reddish, the above-described matrix coefficients $\alpha$ and $\beta$ are made smaller and larger respectively to correct the red and blue components of the video source to be weakened and intensified respectively. On the contrary, when the color temperature of the video source is high, that is, the color of the video source is bluish, the above-described matrix coefficients $\alpha$ and $\beta$ are made larger and smaller respectively to correct the red and blue components of the video source so as to be intensified and weakened respectively. Accordingly, the degradation of the color reproducibility of the chromatic colors due to the change in the color temperature can be prevented.

The above and other objects, features, and advantages of the present invention will become apparent from the following detailed description of illustrative embodiment thereof to be read in conjunction with the accompanying drawings, in which like reference numerals represent the same or similar elements.

BRIEF DESCRIPTION OF THE DRAWINGS

FIG. 1, which is formed of FIGS. 1A and 1B drawn on two sheets of drawings so as to permit the use of a suitably large scale, is a circuit diagram illustrating an example of conventional color video cameras;

FIGS, 3A to 3C are respectively diagrams illustrating changes in the spectrum response according to the change in a color temperature of a video source;

FIG. 4, which is formed of FIGS. 4A and 4B drawn on two sheets of drawings so as to permit the use of a suitably large scale, is a circuit diagram illustrating a color video camera according to an embodiment of the present invention.

DETAILED DESCRIPTION OF THE PREFERRED EMBODIMENT

A preferred embodiment of the present invention will now be described with reference to the accompanying drawings.

Figures 4, 4A:
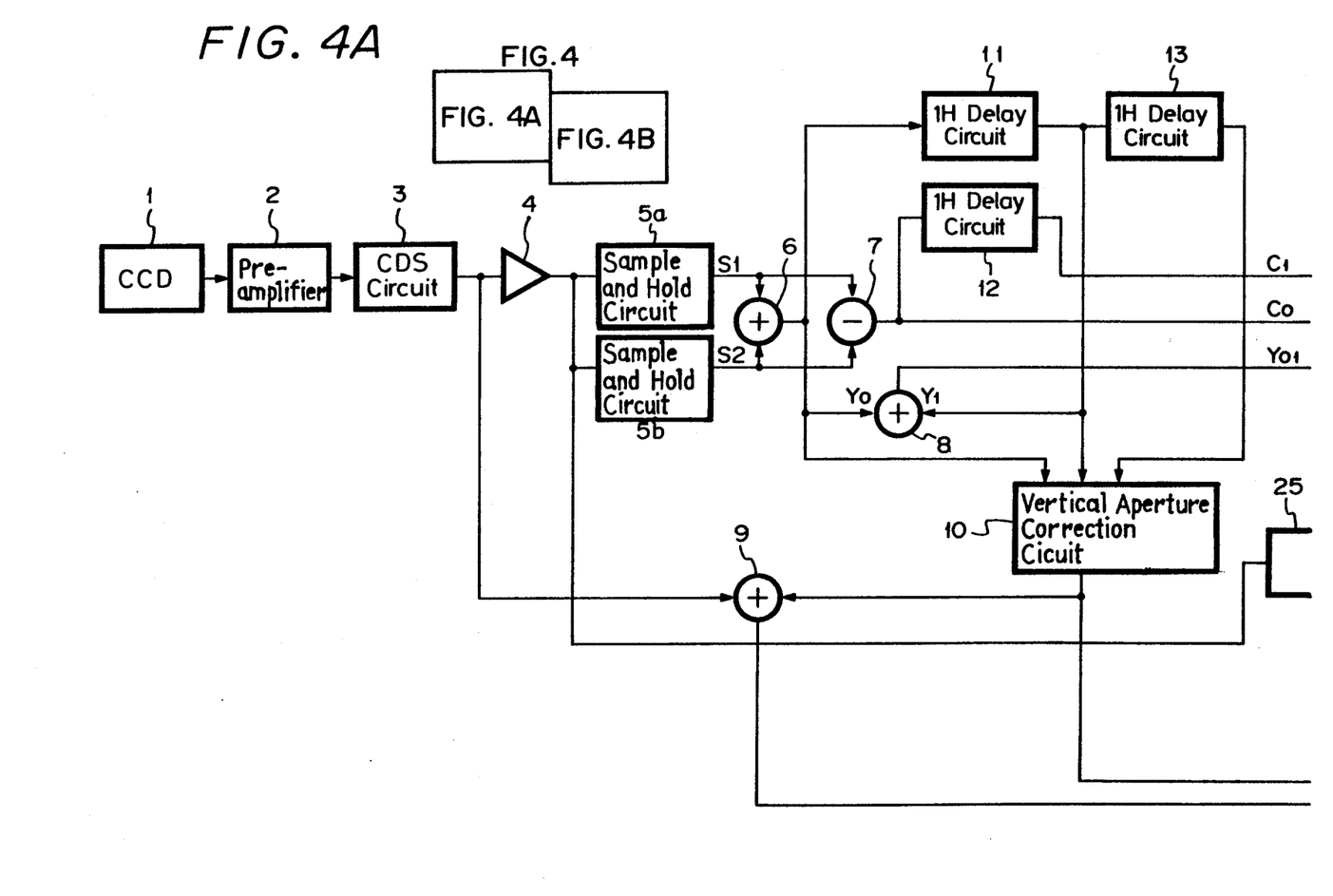
Figure 4B:
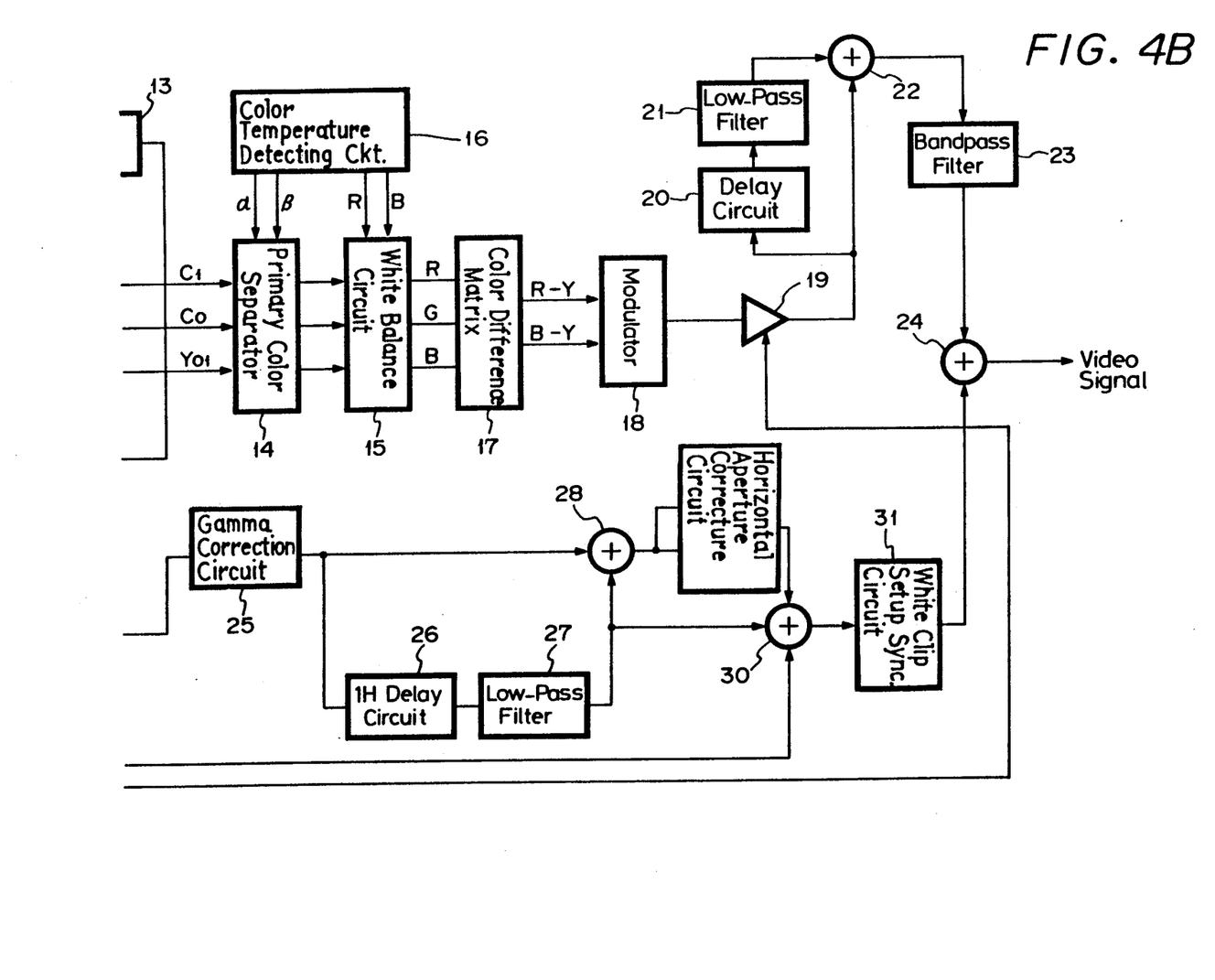
Figure 5:
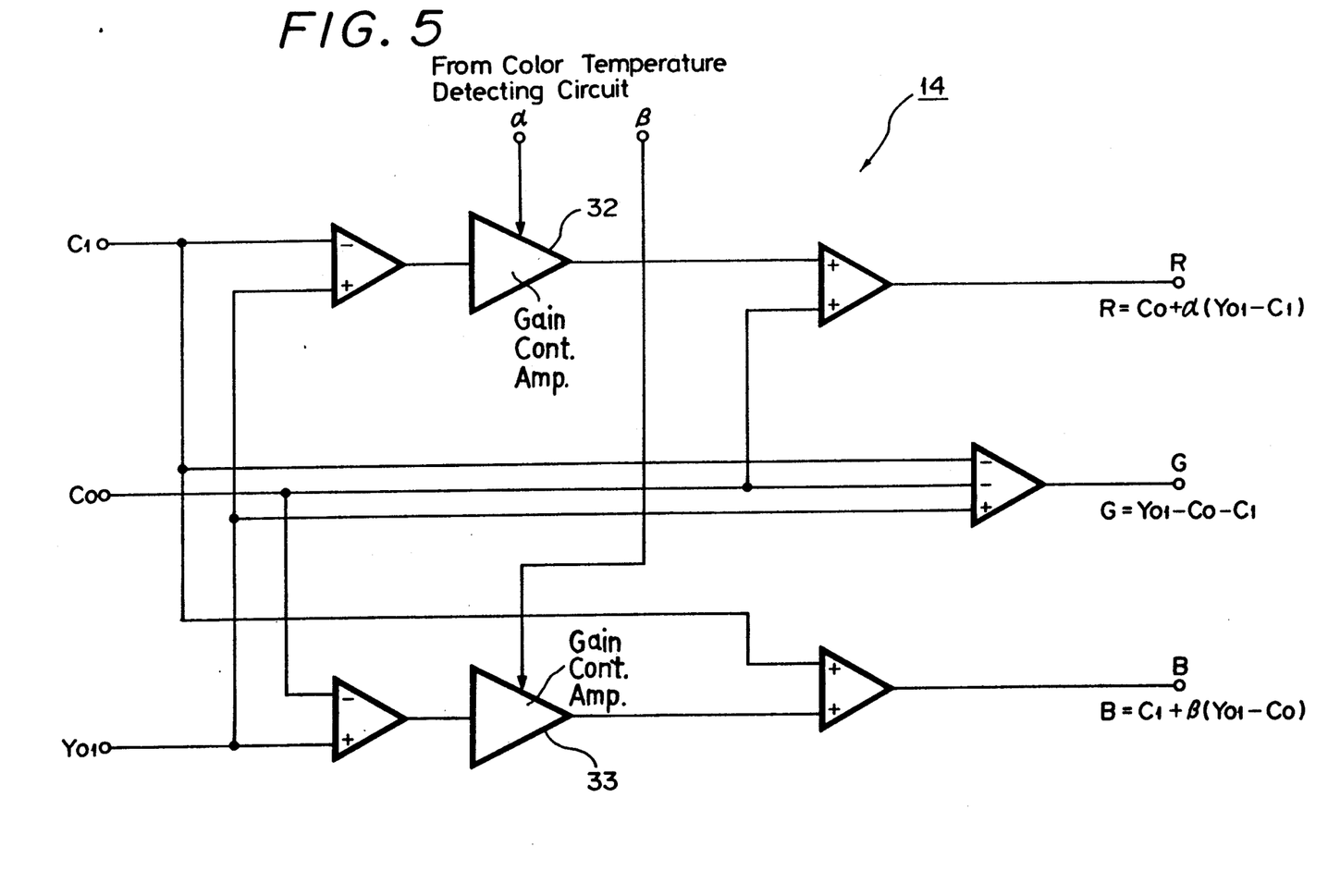
FIG. 5 is a circuit diagram illustrating a primary color separator to which the present invention is applied.

FIGS. 4 and 5 illustrate a preferred embodiment of a color video camera according to the present invention, wherein FIG. 4 is a circuit diagram illustrating a color video camera according to an embodiment of the present invention, and FIG. 5 is a circuit diagram illustrating a primary color separator to which the present invention is applied.

The color video camera of FIG. 4 differs from that of FIG. 1 only in a point that not only a white balance circuit 15 but also matrix coefficients $\alpha$ and $\beta$ of a primary color separator 14 are controlled in accordance with a color temperature detected by a color temperature detector 16, but other circuit configurations of FIG. 4 are the same as those of FIG. 1, and therefore like parts of FIG. 4 corresponding to those of FIG. 1 are marked with the same reference and so need not be described. Now, the color coding of the color filter in this embodiment is the same as that of FIG. 2. Namely, the color coding has a color filter of an even number scanning line which is constituted by a repetitive pattern of four pixels having a magenta-green portion disposed in a lateral direction or horizontal scanning direction each other and a yellow-cyan portion disposed beneath or in the neighboring position of the vertical direction with respect to the position of the magenta-green portion in parallel therewith, and a color filter of an odd number scanning line which is constituted by a repetitive pattern of four pixels having a green-magenta portion disposed in a lateral direction each other and a yellow-cyan portion disposed beneath or in the neighboring position of the vertical direction with respect to the position of the green-magenta portion in parallel therewith.

As shown in FIG. 4, the color temperature detector 16 has, for example, an optical color temperature detecting element disposed on a front panel of a color video camera and a circuit for processing an output signal therefrom. Now, the color temperature detector 16 may be formed by a color temperature detecting circuit of a type of detecting chrominance signals from an output signal of the primary color separator 14, that is, the primary color signals R, G and B.

Output signals from the color temperature detector 16 include a control signal for controlling a gain of a path of a red signal R in the white balance circuit 15, a control signal for controlling a path of a blue signal B therein, and two control signals for controlling two gain control amplifiers of the primary color separator 14 to change the two matrix coefficients $\alpha$ and $\beta$ of primary color separation matrix.

The primary color separator 14 shown in FIG. 5 differs from the conventional one in the constructions thereof only in a point that gains $\alpha$ and $\beta$ of the two gain control amplifiers 32 and 33 are controlled by the two control signals from the color temperature detector 16.

The primary color separator 14 can obtain the primary color signals R, G and B from the chrominance signals $Y_{01}$, $C_0$ and $C_1$ in accordance with the following equations $$R = C_0 + \alpha(Y_{01} - C_1)$$

$$G = Y_{01} - C_0 C_1$$

$$B = C_1 + \beta(Y_{01} - C_0)$$

The gains of the gain control amplifiers 32 and 33 are constants $\alpha$ and $\beta$ of the above described equations $R = C_0 + \alpha(Y_{01} - C_1)$ and $B = C_1 + \beta(Y_{01} - C_0)$, respectively. Thus, the constants $\alpha$ and $\beta$ of the matrix equations for the operation of the red signal R and the blue signal B can be changed by controlling the gains of the gain control amplifiers 32 and 33.

Accordingly, when the color temperature of a video source is low, there is a tendency that a level of the red component is large and a level of the blue component is small, and therefore in order to correct this tendency, the above-described matrix coefficient $\alpha$ is made smaller to lower the level of the red component and the matrix coefficient $\beta$ is made larger to intensify the level of the blue component.

On the contrary, when the color temperature of the video source is high, there is a tendency that a level of the blue component is large and a level of the red component is small, and therefore in order to correct this tendency, the above-described matrix coefficient $\alpha$ is made larger to intensify the level of the red component and the matrix coefficient $\beta$ is made smaller to lower the level of the blue component.

Accordingly, the degradation of the color reproducibility of the chromatic colors due to the change in the color temperature can be prevented.

As described above, the color video camera according to the present invention is comprised of a color imager including a color sensing device for producing a plurality of different chrominance signals line by line; a luminance/chrominance (Y/C) signal processor supplied with the plurality of different chrominance signals and producing first, second and third primary color signals and having a matrix circuit with predetermined matrix coefficients; and a unit for detecting a color temperature of a video source in which the matrix coefficients are changed in response to the output of the detecting unit.

Thus, according to the color video camera of the present invention, the matrix coefficient of a primary color separator is changed in accordance with an output of a detecting circuit for detecting a color temperature of a video source in such a manner that, when the color temperature of a video source is low, that is, the color of a video source is reddish, the above-described matrix coefficients $\alpha$ and $\beta$ are made smaller and larger respectively to correct the red and blue components of the video source to be weakened and intensified respectively. On the contrary, when the color temperature of a video source is high, that is, the color of a video source is bluish, the above-described matrix coefficients $\alpha$ and $\beta$ are made larger and smaller respectively to correct the red and blue components of the video source to be intensified and weakened respectively. Accordingly, the degradation of the color reproducibility of the chromatic colors due to the change in the color temperature can be prevented.

Having described the preferred embodiment of the invention with reference to the drawings, it is to be understood that the invention is not limited to that precise embodiment and that various changes and modifications thereof could be effected by are skilled in the art without departing from the spirit or scope of the invention as defined in the appended claims.

What is claimed is:

1. A color video camera, comprising:
   (a) a color imager including a color sensing device means for producing a plurality of different chrominance signals line-by-line and means for producing a luminance signal;

(b) a luminance/chrominance (Y/C) signal processor means supplied with the luminance signal and the plurality of different chrominance signals for producing first, second and third primary color signals, said Y/C signal processor means having a matrix circuit with predetermined matrix coefficients;

(c) means for detecting a color temperature of a video source;

(d) control means for controlling the matrix coefficients in response to the output of said detecting means; and (e) means connected to receive said first, second, and third primary color signals and for outputting a video signal.

2. A color video camera according to claim 1, in which said color sensing device has a color filter disposed on the surface thereof.

3. A color video camera according to claim 2, in which said color filter is formed as a mosaic pattern, said mosaic pattern including:
   a first type color sensing element;
   a second type color sensing element arranged in a neighboring position of the horizontal scanning direction with respect to the position of the first type color sensing element;
   a third type color sensing element arranged in a neighboring position of the vertical scanning direction with respect to the position of the first type color sensing element; and
   a fourth type color sensing element arranged in a neighboring position of the horizontal scanning direction with respect to the position of the third type color sensing element.

4. A color video camera according to claim 3, in which the positions of said first and second type color sensing elements are exchanged to each other, line by line, in the horizontal scanning direction.

5. A color video camera according to claim 3, in which said first type color sensing element is sensitive to a magenta region of the spectrum response, said second type color sensing element is sensitive to a green region of the spectrum response, said third type color sensing element is sensitive to a yellow region of the spectrum response, and said fourth type color sensing element is sensitive to a cyan region of the spectrum response.

6. A color video camera according to claim 1, in which said matrix circuit includes a plurality of gain control amplifiers, and each gain of said gain control amplifiers being controlled in response to the output of said detecting means.

7. A color video camera according to claim 1, in which said color imager includes a charge coupled device.

8. A camera according to claim 1 wherein said signal processor means includes a white balance circuit means for reproducing a white object as a white image and wherein said control means also adjusts white balance dependent upon the color temperature of the video source.

9. A color video camera, comprising:
   a color imager including a color sensing device means for producing at least two different chrominance signals and means for producing a luminance signal;
   primary color separator means having input thereto said luminance signal and said different chrominance signals and for outputting, by use of a matrix, primary color signals;
   white balance circuit means receiving said primary color signals and for outputting white balance adjusted primary color signals;
   color temperature detecting means for detecting color temperature of a video source;
   control means connected to said color temperature detecting means for controlling matrix coefficients of said matrix in said primary color separator means and for controlling white balance in said white balance means depending on detected color temperature of the video source; and
   means connected to receive said adjusted primary color signals and for outputting a video signal.

10. A camera according to claim 9 wherein said white balance means reproduces a white object as a white image by adjusting gain of the primary color signals.

11. A camera according to claim 9 wherein two chrominance signals are input to said primary color separator means along with said luminance signal, and said white balance means outputs white balance adjusted RGB primary color signals.

12. A color video camera having a color temperature compensation circuit, comprising:
   a color image sensor means for producing an output signal comprising a plurality of different chrominance signals line-by-line;
   a luminance/chrominance (Y/C) signal processor means supplied with the output signal from said color image sensor means for producing a luminance signal and the plurality of different chrominance signals;
   a primary color separator means supplied with said luminance signal and said plurality of different chrominance signals for producing first, second, and third primary color signals (R, G, B) and having a matrix circuit with predetermined matrix coefficients;
   means for detecting a color temperature of a video source; and
   control means for controlling the matrix coefficients of said primary color signal in response to an output from said detecting means.

* * * * *